Dec. 25, 1956     W. E. WREAD     2,775,262
SEMI-STEEL REINFORCED CONCRETE PIPE
Filed June 26, 1953
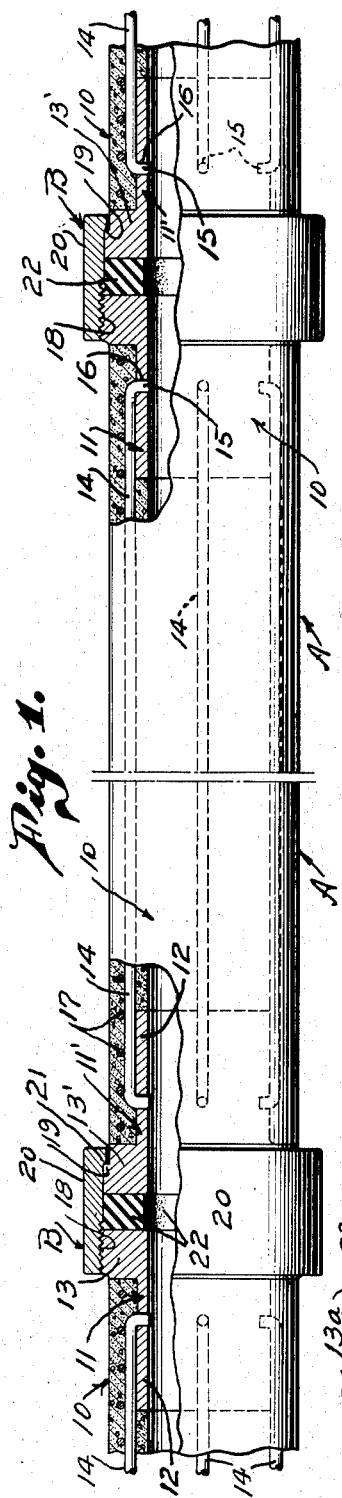
INVENTOR.
WILLIAM E. WREAD,
BY
his ATTORNEY.

United States Patent Office 2,775,262
Patented Dec. 25, 1956

2,775,262

SEMI-STEEL REINFORCED CONCRETE PIPE

William E. Wread, Los Angeles, Calif.

Application June 26, 1953, Serial No. 364,276

1 Claim. (Cl. 138—84)

My invention relates to the production of tubular reinforced concrete structures and particularly to the production of pipe or conduit of this type.

While reinforced concrete conduit is in wide use because of its smaller cost as compared to steel conduit, it has some disadvantages as heretofore constructed, among these might be mentioned the difficulty of assuring secure joints between lengths of the conduit or pipe as compared to the simple coupling arrangements used between lengths of iron or steel pipe, and further, the necessity of providing for expansion and contraction which might cause cracking and crumbling at the joints in the event provision therefor has not been made. Another disadvantage of cement pipes as compared to those of iron or steel is the relative weakness in tension and shear, unless carefully reinforced to withstand such stresses.

It is an object of my invention to provide a novel reinforced concrete conduit produced in lengths which may be easily and securely connected together as is iron or steel pipe.

A further object of my invention is to produce novel lengths of concrete pipe so reinforced that such pipe may be made as strong in tension and shear as steel pipe but at much less cost than the latter.

Another object of my invention is to provide a novel reinforced concrete pipe with metal end joint portions enabling lengths of pipe to be joined together by the use of connecting means normally used for connecting iron and steel pipe.

A still further object is to provide a novel liquid tight joint between adjacent and connected lengths of reinforced cement pipe constructed according to my invention and which joint is relatively flexible in contrast to the ususal bell and butt type of joint which requires a caulking to be tamped therein in order to effect proper sealing of the joint connection.

Yet another object of my invention is to provide for concrete pipe constructed as hereinafter described, a simple and novel arrangement of fluid tight joint connections which will permit expansion and contraction of the pipes without imposing deleterious stresses thereon, and that will insure a fluid tight connection at all times.

Heretofore, heavy demands have been made upon the steel production of our country to supply the demands of industry for steel pipe, and another object of my invention is to provide a novel, simple, inexpensive and efficient semi-steel and reinforced concrete pipe which may be connected together with the same ease and dispatch as metal pipes and in which the necessary quantities of steel required is materially reduced to provide a pipe that has substantially the same strength as steel pipe, but which may be manufactured at a fraction of the cost of steel pipe.

The invention resides in the parts and combination and arrangement of the parts, as well as the method of forming reinforced concrete tubular parts for conduits, as more fully hereinafter described in detail in the accompanying specification and defined in the claim.

Other objects, advantages and features of invention may appear from the accompanying drawing, the subjoined detail description, and the appended claim.

The accompanying drawing illustrates the invention in some of the forms I at present deem preferable.

Figure 1 is a fragmentary side elevational view with portions broken away to more clearly illustrate sections of the reinforced pipe or conduit of my invention joined together by my novel coupling means.

Fig. 2 is a fragmentary longitudinal section on enlarged scale, and taken along the median line of Fig. 1.

Fig. 3 is a cross-sectional view taken on line 3—3, Fig. 2; and

Fig. 4 is a fragmentary side elevational view on a smaller scale, with portions broken away to show interior structure, of a slightly modified form of my novel coupling means.

The lengths of pipe A are readily produced on a cylindrical collapsible form or by casting in suitable two part molds, or by spraying against the surface of a rotatable form, but since such procedures are well known they will not be further herein described.

In Figure 1 the numeral 10 indicates generally a length of pipe or conduit constructed according to my invention.

Each length of pipe comprises metal joint members 11, 11', one at each end of a length of pipe. The joint members are each formed with a sleevelike portion 12 and a radial end flange 13, 13' and which flange is of greater outside diameter than the outside diameter of the pipe as formed between said flanges.

The radial end flanges 13, 13' are utilized to connect lengths of pipe together as later explained.

The reinforcing tie rods 14 extend between and are connected to the sleeve portion 12 of the spaced joint members 11, 11'. While the tie rods 14 may be secured in any suitable manner to the joint members 11, 11', I prefer to provide the tie rods 14 with hooked or sharply bent ends 15 which are fitted into holes 16 drilled through the sleeves 12.

A length of reinforcing rod 17 is spirally wound helically around the tie rods 14 which are shown as four in number, although of course any number over two or four may be used. The reinforcing helixes 17 preferably lie against the outside of the rods 14 and are thereby maintained in position during formation of the pipe.

Concrete mix is then positioned around the metal framework just described, as for instance by rotating the frame on end pivots (not shown) while laying the concrete in position in any suitable way, until the required wall thickness has been built up. As shown in the drawings, the wall thickness is sufficient to embed the tie rods 14 and helical reinforcing member 17 while leaving the flange members 13, 13' projecting radially from the pipe to enable the coupling means B securing adjacent flanges together to be installed. It will thus be seen that the metal end flange members 13, 13' for coupling the pipe lengths together are arranged and cast into and become a part of the pipe length.

As shown in Figs. 1, 2 and 3 the outer circumferential face of the flange 13 at one end of a length of pipe A is threaded, as indicated at 18, and the flange 13' at the opposite end is provided with a circumferential shoulder indicated at 19.

The lengths of pipe made as shown in Figs. 1, 2 and 3 are tightened together by means of a coupling nut 20 positioned on the left hand joint members before the tie rods 14 and reinforcing helix 17 are put in place. The coupling nut 20 is formed with an inwardly projecting shoulder 21 which is adapted to engage with shoulder 19 on flange 13'.

In order to seal the joint between lengths of pipe and allow for expansion and contraction, a thick washer 22 of rubber or rubber-like material is positioned between the facing ends of adjacent flanges 13, 13'. The internal diameter of the washer 22 is greater than that of the pipe 10 so that when compressed by tightening of nut 20 or expansion, the washer 22 will not protrude inwardly into the inner bore of the pipe.

In this form of the invention lengths of pipe 10 are connected together by positioning washers 22 between the ends of pipe lengths to be connected, the threaded portion of a coupling nut 20 being engaged with the threaded flange 13, and the coupling nut 20 is tightened up with a pipe wrench, thus connecting the pipe lengths together without rotating the pipe. Obviously the coupling nut 20 could, if preferred, be furnished with flats enabling an ordinary wrench to be used.

In Fig. 4 I show a slightly different joint between the pipe lengths; in this form the flanges 13a of the joint members 11a are of sufficient diameter to receive bolts 23 and nuts 24 by which the flanges 13a may be tightened together. I may, in smaller sizes of pipe in which the tie rods afford sufficient reinforcement, dispense with the helical reinforcement as shown in Fig. 4.

It is pointed out that the reinforced cement or concrete pipe and conduit of my invention possesses the strength of steel pipe although made with a thinner wall than the usual form of reinforced concrete pipe, and pipe lengths may be connected together with the same ease as in steel pipes, and thereby I provide a pipe length of reinforced concrete with steel coupling ends at a small fraction of the cost of an all steel pipe length.

Provision is made for expansion of the pipe lengths by the provision of the washers or gaskets 22 of resilient material compressed between the end joint members of abutting lengths of pipe since when under compression they are sufficient to seal the joint, the washers or gaskets 22 may be still further compressed under the effects of expansion in the concrete, without any ill effects on the gaskets and compensate for effective sealing of the joint upon contraction of the pipe lengths.

Although it will be evident that the reinforced concrete pipe of my invention provides many valuable advantages it may be more cheaply produced than iron or steel pipe of comparative capacity.

While I have specifically described and illustrated preferred embodiments of my invention, it is pointed out that various modifications may be made in the embodiments described by those skilled in the art without departing from the scope of my invention as intended to be defined by the appended claim.

I claim:

A pipe of reinforced concrete, comprising a plurality of pipe lengths connected together and laid end to end with the joint member of one pipe length abutting the joint member of an adjacent pipe length, each pipe length including a pair of metal end joint members having a sleeve like part extending toward the opposite end of the pipe, and a radially outwardly extending peripheral flange; reinforcing tie rods secured to said sleeve like part and connecting said joint members; a helical coil of reinforcing rod extending from the sleeve portion of one end joint member to the sleeve portion of the other joint member; a wall of cementitious material covering one side of the sleeve like portions of said joint members and embedding said helical coil and reinforcing tie rods, but leaving the exterior periphery of said flanges exposed and extending beyond the outer diameter of the finished pipe; and means cooperating with abutting joint members to connect adjacent pipe lengths together.

References Cited in the file of this patent
UNITED STATES PATENTS

| | | |
|---|---|---|
| 823,346 | Maxwell | June 12, 1906 |
| 958,043 | Stockley | May 17, 1910 |
| 1,027,565 | Ramage | May 28, 1912 |
| 1,443,162 | Bent | Jan. 23, 1923 |
| 1,804,888 | Monsch | May 12, 1931 |
| 2,318,112 | Stillwagon | May 4, 1943 |
| 2,569,612 | Laurent | Oct. 2, 1951 |
| 2,660,199 | Montgomery | Nov. 24, 1953 |